United States Patent [19]
Schele

[11] 3,879,158
[45] Apr. 22, 1975

[54] APPARATUS FOR EXTRUDING THERMOPLASTIC ANNULAR SHAPES

[76] Inventor: Enrique Schele, Calle Norte 3 No. 90-C, Mexico 9, D.F., Mexico

[22] Filed: Jan. 9, 1973

[21] Appl. No.: 322,172

[52] U.S. Cl.............. 425/380; 425/326 R; 425/467
[51] Int. Cl............................................ B29d 23/04
[58] Field of Search................. 425/326 R, 380, 467

[56] References Cited
UNITED STATES PATENTS

| | | | |
|---|---|---|---|
| 3,051,990 | 9/1962 | Peterson.......................... | 425/380 X |
| 3,244,781 | 4/1966 | Covington et al............ | 425/326 R X |
| 3,694,292 | 9/1972 | Schippers et al. .............. | 425/114 X |

*Primary Examiner*—R. Spencer Annear
*Attorney, Agent, or Firm*—M. A. Baskin

[57] ABSTRACT

An apparatus and method for producing annular extrudates of thermoplastic material characterized by uniformity of wall thickness and freedom of markings is provided. This is accomplished by compressing a molten thermoplastic by means of a rotating screw through an annular die having a rotating pin and a stationary bushing wherein the pin rotates in the same direction as the rotating screw and desirably is connected to the end of the screw. In a preferred embodiment the thermoplastic contact with the rotating pin is terminated prior to the termination of its contact with the stationary bushing. The compression of the molten thermoplastic is effected solely by screw generated pressure.

6 Claims, 10 Drawing Figures

APPARATUS FOR EXTRUDING THERMOPLASTIC ANNULAR SHAPES

STATE OF THE PRIOR ART

There are various processes by which thermoplastic polymer film has been effectively produced such as by the blown bubble extrusion process. These processes, while relatively effective with heat stable polymers, have encountered several severe problems with respect to heat sensitive polymers. Even in the case of heat stable polymers which flux easily, these problems can occur to a greater or lesser extent.

One of the most common processes employed for the production of thin film is the blown bubble extrusion process. In the operation of this process, the polymeric material is fluxed to a temperature sufficient to permit extrusion. It is moved under pressure to an annular die having fixed in the center thereof a core or pin. The extrudate is in the form of a tube or pipe, a bubble of air or other fluid is introduced and trapped in this tube between the annular die and a set of pinch rolls which continuously flattens the bubble of polymer film. Thus, the air bubble is maintained between the die orifice and the pinched rolls. The entrapped air continuously stretches the hot extruded polymer pipe, causing it to distend to a thin wall polymer bubble.

In respect to the die, the die core or pin is held in the center of the die by support members or legs known collectively as a spider. These support members create drag on the fluxed polymer which can result in lines or marks in the film product. When a heat-sensitive polymer is extruded, decomposition of the polymer will generally occur in the areas of drag.

There have been various attempts to overcome the problems inherent in the traditional blown bubble extrusion process and apparatus, and several modifications have been proposed.

One such attempt has been to streamline and reduce the thickness of the die core or pin support members. This, however, is ineffective to eliminate the marks in the film. Heating the thin or streamlined die core supports tends to reduce the marks somewhat, but is unsuitable for use with heat-sensitive polymers since degradation and discoloration result. This is a particularly severe problem with pigmented films, such as white film, which generally have greater heat-sensitivity and present poorer rheological characteristics.

Another attempt to eliminate spider markings on film is through the employment of a side-fed die, which results in a single line in the product film. This process has been somewhat effective with non-heat degradable polymers.

U.S. Pat. No. 3,387,331 to M. Billings discloses an Apparatus for Extruding Seamless Plastic Tubing, comprising generally a housing, a hollow screw-type extruding member within the housing, with the screw flights adapted to extrude the thermoplastic material downwardly through an annular passageway between the screw and housing, and a shaft rotatably journaled within the hollow screw-type extruding member. The extruding screw is gear driven from a power source at its upper end, and the lower end of the center shaft projects below the extruding shaft and is screw threaded to a forming pin. The entire face area of the lower end of the forming pin is coplanar with the entire face of a die, fixed to the housing, defining an annular die orifice from the extruding screw.

A second gear drive means is fixed to the pin carrying shaft to impart rotation thereto, either in the same direction as the extruding screw or in the opposite direction at the same or a lower speed. A single passageway is formed through the shaft whereby a pressurized fluid or air may be supplied to the extrusion.

U.S. Pat. No. 3,256,377 to J. F. E. Adams discloses a device for Extrusion of Plastic Tubes which includes an extruding screw for feeding the thermoplastic material from the side into a passageway. A die cover is fixed to the outlet end of a housing which cooperates with a core or pin, extending generally at right angles to the extruding screw, to form an annular die orifice. The entire face areas of the cover die and pin are coplanar. The die pin is driven by a rack and pinion gear arrangement whereby the pin is rotated and the rotation is reversed during various stages of the extruding operation. The pressure to move the extrudate through the orifice is supplied solely by the side feed screw.

Both of the above named patents provide closed systems, that is, they are not vented to the atmosphere. This condition creates variable pressures within the device, making it very difficult to accurately control the flow of polymer material from the extruder. The molten thermoplastic material in both devices simultaneously terminates contact with the rotating die pin and the stationary die bushing.

BACKGROUND OF THE INVENTION

The present invention relates to a method and apparatus for producing annular thermoplastic extrudates characterized by uniformity of wall thickness and the absence of surface markings. The invention is also suitable for the extrusion of thermoplastics which are relatively heat sensitive and which, for this reason, do not normally lend themselves to thermal extrusion.

While the process and apparatus of this invention can be effectively used to produce annular extrusions of any practical dimension, they are most advantageously used in the production of thin film in conjunction with the blown bubble process and advantageously in the production of large diameter thick walled pipe.

Therefore, the primary objective of the present invention is to provide both an apparatus and process for the production of annular extrudates free of lines and markings.

It is another object of this invention to provide a process and apparatus for the production of annular extrudates which substantially eliminate the problem of surging.

It is still another object of the invention to provide a process and apparatus for the production of annular extrudates of relatively heat-sensitive thermoplastic materials.

It is yet another object of this invention to provide a method and apparatus for the production of thin walled thermoplastic film characterized by an absence of surface lines or marks.

It is still another object of this invention to provide a process and apparatus for the production of thick-walled, large diameter thermoplastic pipe.

It is yet another object of this invention to provide a method for the production of structural thermoplastic plate.

The manner in which these and other objects and advantages of this invention will be obtained will become apparent from the following detailed description taken in conjunction with the drawings, in which:

FIG. 3 illustrates diagrammatically in vertical cross section, an enlarged partial view of a preferred system for cooling the die screw and pin, and for inflating the extrusion bubble.

FIG. 10 illustrates diagramatically an embodiment of this invention wherein the die bushing corner is cut back in an arcuate configuration. Detailed Description of the Invention Referring to FIG. 1, there is a diagrammatically illustrated extrusion system for the manufacture of thin-walled tubing or film in which the screw-die extruder of the present invention is included. The extruding system includes a conventional or first extruder 10, and an auxiliary screw-die extruder 12 which is mounted on the discharge end of the first extruder 10 by means of an adapter 14 protruding from the side of the screw-die extruder.

Figures 1, 4:
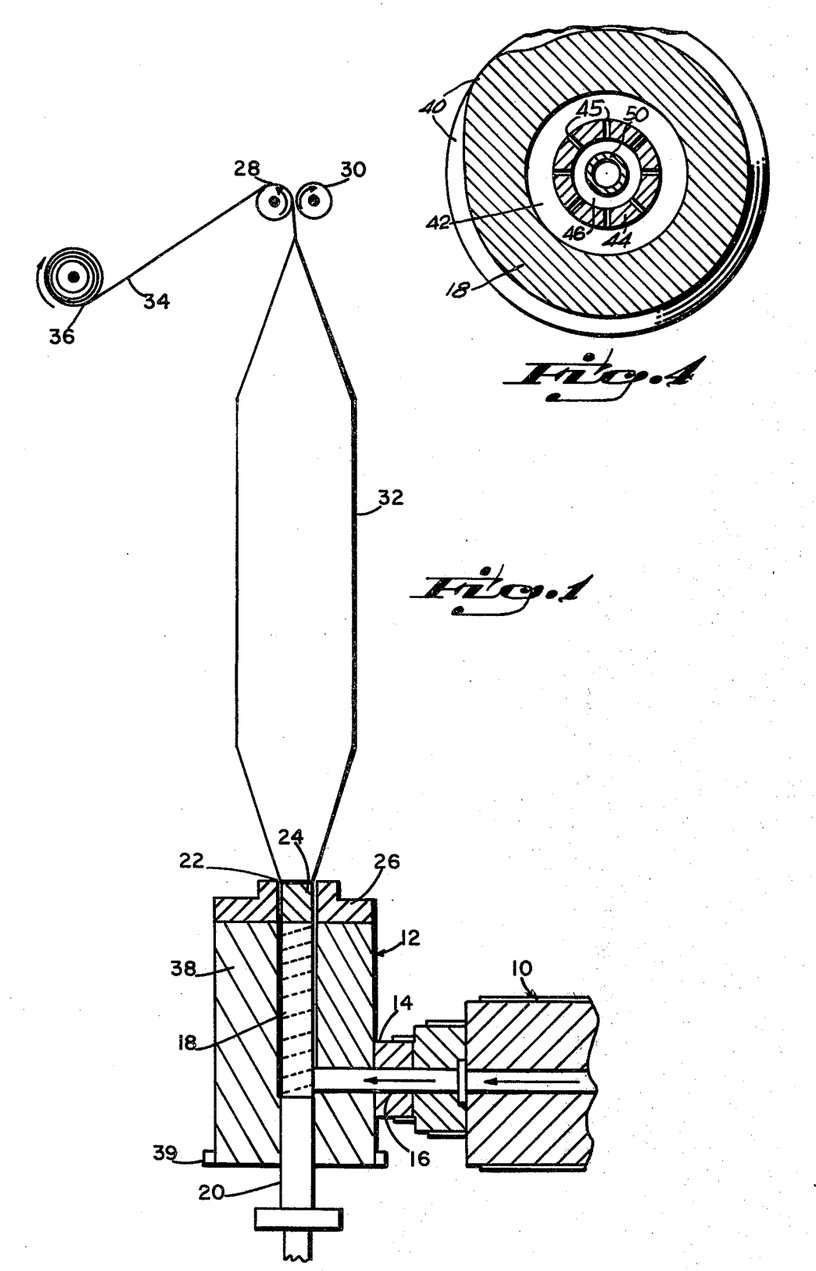
FIG. 1 illustrates diagrammatically, an extruding system in which the screw-die extruder of the present invention is incorporated.
FIG. 4 is a horizontal cross section taken along the line 4—4 of FIG. 2.

Passageway 16 is provided within the adapter 14 and extending through the wall of the screw-die extruder 12 for feeding the molten thermoplastic material, or extrudate, produced by the first extruder 10, to the screw-die extruder 12. In some applications it might be desirable to feed cold thermoplastic material in the form of powder or pellets into the screw-die extruder 12. The extrudate is advanced through the screw-die extruder 12 by a pressure generating screw 18 rotatably mounted therein and connected to a drive means (not shown), by a drive shaft 20. The screw-die extruder 12 is attached to the base plate 39 through connection with barrel 38.

Figure 2:
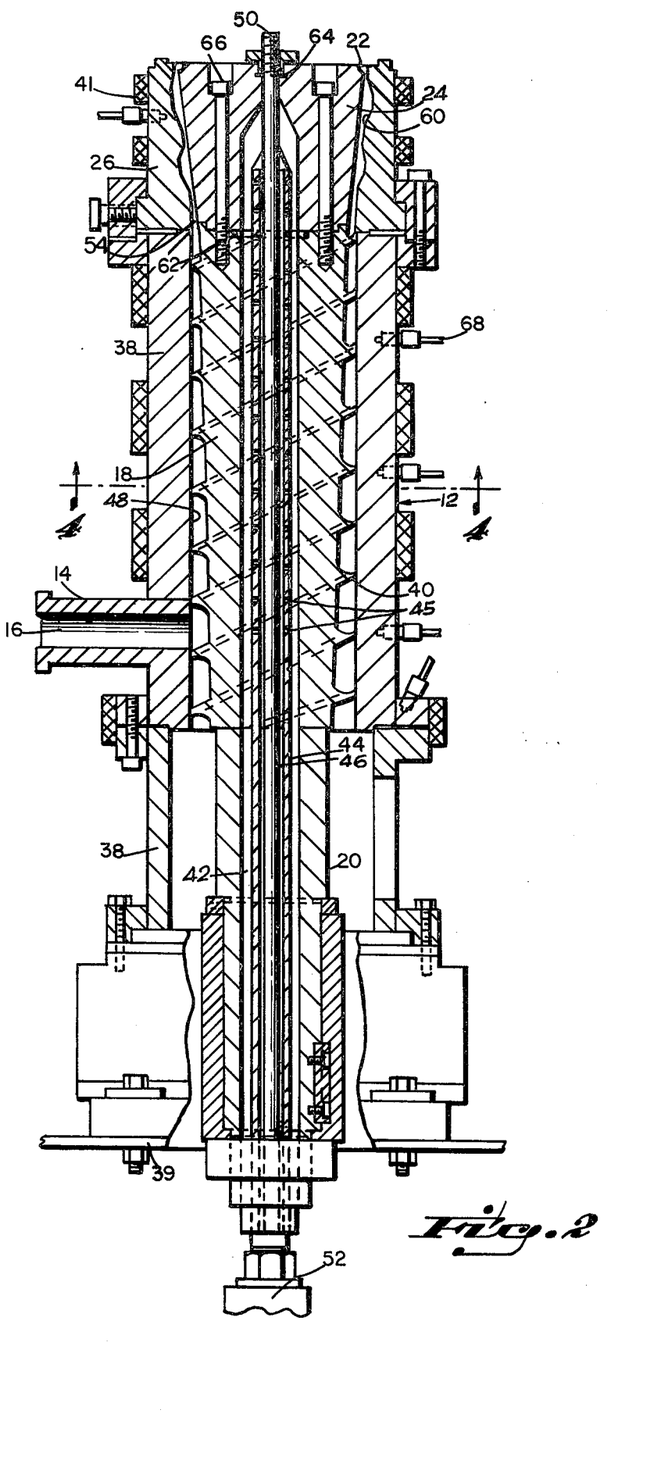
FIG. 2 illustrates in vertical cross section a view of the screw-die extruder of the present invention.
Figure 5:
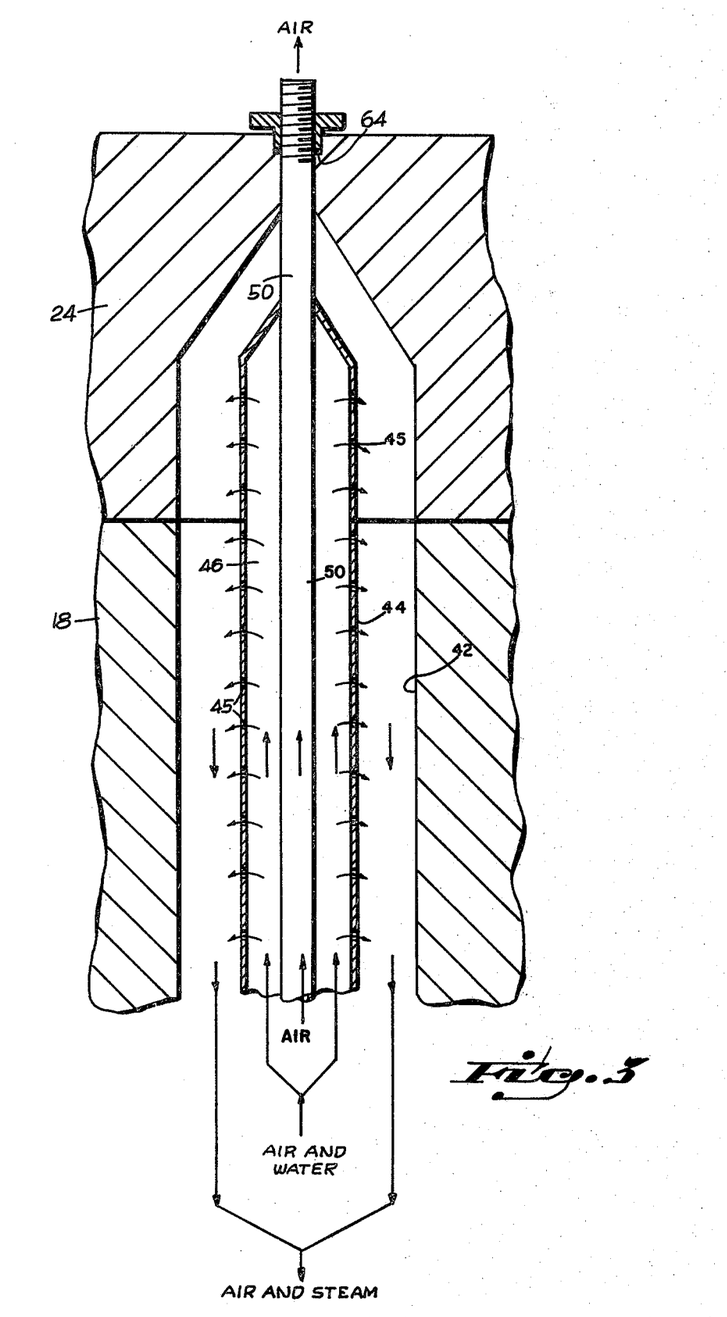
FIG. 5 illustrates diagrammatically a conventional relationship of a pin and die thereof.
Figure 6:
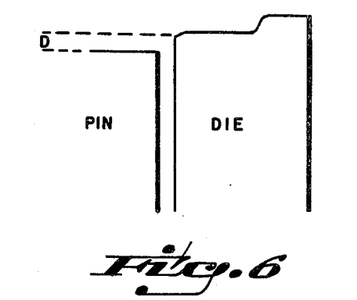
FIG. 6 illustrates diagrammatically an embodiment of this invention wherein the pin is recessed relative to the die.
Figure 7:
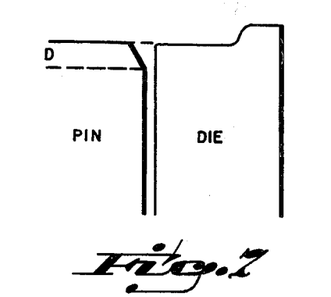
FIG. 7 illustrates diagrammatically an embodiment of this invention wherein the pin is level with the die and one corner of the pin is chamfered.
Figure 8:
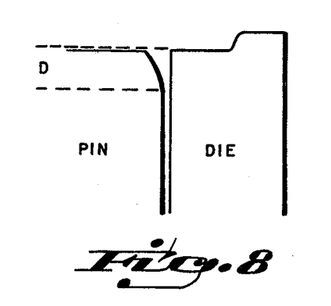
FIG. 8 illustrates diagrammatically an embodiment of this invention wherein the pin periphery is cut back in an arcuate configuration.
Figure 9:
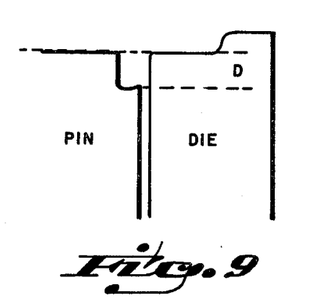
FIG. 9 illustrates diagrammatically an embodiment of this invention wherein the pin periphery is cut back in a right angled configuration.

The molten polymer material is emitted from the screw-die extruder 12 through annular orifice 22 formed between die pin 24, mounted on the discharge end of the screw 18, and die bushing 26 encompassing die pin 24. Upon leaving the die orifice 22, the extruded material or polymer film is in a tubular form. The tubular film is then inflated into a bubble 32 by a source of air (as shown in FIGS. 2 and 3, and discussed below) to a size dictated by the film specifications desired. The tubular film is then pulled between a pair of pinch rolls 28 and 30. The size of the bubble of film 32 remains constant with the air being trapped between the orifice 22 and the nip of the pinch rolls 28 and 30. The size of the bubble of film 32 and the thickness of the film is determined by the amount of air injected into the tubular structure or bubble and by the rate at which the film is pulled by the pinch rolls 28 and 30. The bubble of film 32 is flattened as it traverses the pinch rolls 28 and 30 and can be slit along one side and opened up into a sheet of film 34 and rolled up onto a take-up roll 36.

The thickness of the film, as indicated above, is controlled by the amount of air supplied to the tubular structure and by the rate at which the film is pulled off by the pinch rolls 28 and 30. By having a large diameter bubble and pulling the film off at a high rate, a thin film is produced. Accordingly, the conditions can be varied according to the thickness desired and to the thickness and diameter of the extrudate. For example, considering only the pull-off rate of the pinch rolls, if this rate is 100 feet-per-minute for the production of 1-mil film, a 2-mil film could be produced by a pull-off rate of only 50 feet-per-minute, all other conditions remaining constant.

According to the present extruding system, it has been found effective to employ a conventional extruder 10 as a feed mechanism for the screw-die extruder 12. The screw-die extruder 12 is generally shorter and is mounted perpendicular to the "feed" extruder 10 in a manner whereby the polymer material, or tubing, from the screw-die extruder 12 is extruded upward. Although it is preferred to extrude the polymer material upwardly, it may be extruded horizontally or downward. The pressure necessary to extrude the polymer material is generated solely by the die screw 18 rotating within the screw-die extruder 12.

With reference to FIG. 2, there is shown an enlarged detailed view of the screw-die extruder 12. As shown, the screw-die extruder 12 includes adapter 14 which is extended from one side of a barrel 38 through which the passageway 16 is extended from the adapter 14. The barrel 38 is supported on a base plate 39.

Die screw 18 is rotatably mounted in a hole 48 in the barrel 38 and provides a plurality of flights 40 extending continuously from its bottom and throughout its full length. On the discharge end of die screw 18 is mounted die pin 24 which rotates in the same manner and at the same rate of speed as does the die screw 18. Surrounding and encompassing the die pin 24 is die bushing 26 which is mounted on top of the barrel 38. Die pin 24 and bushing 26 form the orifice 22 through which the extrudate is emitted from the screw-die extruder 12.

Screw-die extruder 12 is open or vented at its base. The screw 18 may be made an intergral part of the drive shaft 20 or may be connected thereto by a suitable connecting means. The drive means may be any suitable means which will provide sufficient power, such as a rate-controlled motor.

In the operation of the present extruding system, the screw-die extruder 12 is started before the feed or first extruder 10, and then the rates (i.e., revolutions per minute) of the extruders are adjusted to provide a smooth uniform flow of material. Accordingly, if the screw-die extruder 12 is operating at such a low rate that molten polymer is discharging from its bottom or rear end, then its rotational speed must be increased until there is a smooth flow of material through orifice 22 and the material loss is eliminated.

Generally, the amount of material fed by the feed extruder 10 to the screw-die extruder 12 is the same as the capacity of the screw-die extruder. With this arrangement, the flow of material is generally uniform, and good results are produced.

As shown in FIG. 2, the screw-die extruder 12 is uniformly heated by means of surrounding heating bands 41. The temperature is monitored by a plurality of thermocouples 68. With this means of heating plus the frictional heat developed in the polymer, the screw 18 and die pin 24 are heated and maintained at a uniform temperature determined by the polymer being extruded. Also, as shown in FIG. 2 and in greater detail in FIG. 3, a cooling system is provided in the screw-die extruder 12 to cool and maintain a uniform temperature of the screw 18 and die pin 24. This cooling system is provided because the screw-die extruder 12 is insulated and will generally experience a temperature rise during the extrusion operation. Accordingly, any overheating of the screw 18 and die pin 24 is prevented by the operation of the cooling system and the formation of heat marks in the extruded polymer film is avoided.

With reference to this cooling system shown in FIG. 2 and illustrated in FIG. 3, a hole 42 is provided through the screw 18, drive shaft 20 and the pin 24. In the hole 42 there is installed an axially extending air tubing 50, through the shaft 20, screw 18 and die pin 24, which terminates outside die pin 24. Air is provided under pressure through air tubing 50 to inflate the extruded tubular film into a bubble 32 as illustrated in FIG. 1 and discussed above. The amount and rate at which the air is discharged from the air tubing 50 is controlled.

A coaxially extending, enlarged cooling tubing 44 surrounds the air tubing 50 in hole 42, forming an annular passageway 46 therebetween, through which a water fog, mist or spray is passed for cooling purposes. The water fog, mist or spray is passed from cooling tubing 44 through small hole 45 at various points along the length of tubing 44 to the inside of screw 18 and die pin 24. The annular space between the wall of hole 42 and the outside wall of the cooling tubing 44 forms an exit passageway into which the water spray is discharged as steam, produced by evaporation, the steam being vented at the end of shaft 20.

Operation of Extruding System

In the operation of the present system the feed extruder 10 melts and churns the polymer. The molten polymer from the feed extruder 10 is fed under only a feed pressure in a molten mass to the screw-die extruder 12. As the polymer material is fed through the passageway 16 to the screw 18, it is in effect cut into chunks by the screw flights 40 and is carried upward toward the die orifice 22 by the flights 40 of the rotating screw 18. The main body portion of the die screw tapers upwardly and outwardly creating an ever decreasing area through hole 48, causing the chunks of molten polymer, advancing upwardly between the flights 40, to reach a point where they are compressed and fill the spaces therebetween. Thereafter the molten polymer is further compressed by the action of the screw and is advanced upward through the die orifice 22 which shapes it into a continuous tubular structure. It is preferable that the material fed from the feed extruder 10 have uniform delivery, because it has been found that a more uniform pressure results and a polymer extrudate having more uniform characteristics is produced.

In case cold thermoplastic material in the form of powder or pellets is fed into the screw-die extruder 12, the material is picked up by screw 18 and is heated, melted, churned and pushed forward in a manner similar to the above.

The screw-die extruder 12 is an open system relative to the atmosphere and all the pressure necessary to overcome the back pressure developed by the die orifice 22 and to advance the polymer material through the die orifice 22 is generated by the rotation of the screw 18. There is no pressure created in the screw-die extruder 12 by the operation of the feed extruder 10 because the former is vented. Accordingly, the pressure in the molten polymer from the feed extruder drops from a high pressure, e.g. 2,000 – 4,000 psi to 0, upon its entrance into the screw-die extruder 12. As a result, the flow of polymer material through the screw-die extruder 12 is controlled more easily and accurately.

In the present screw-die extruder 12, because the die pin 24 is rotating, the back pressure developed by the die orifice 22 is very low in comparison with a die having a stationary die pin. Accordingly, less pressure is required to be generated within the screw-die extruder 12 to overcome the back pressure of the die orifice 22 and to extrude the polymer material. Because of this reduced frictional back pressure, temperature is more easily controlled and light pigmented films are not discolored.

As shown in FIG. 2, die pin 24 is secured to the forward end of die screw 18 by a plurality of bolts 66, and sealing is provided by O-rings 62 and 64; the die pin 24 can be welded to die screw 18 which provides greater strength and avoids the need for a seal, such as O-ring 62. This would, of course, be desirable if changes in the size or configuration of the die pin were not contemplated. If, however, frequent changes are contemplated in the pin and die, then the bolt and seal combination is convenient.

With respect to the die screw 18, where the helix angle of the flight is constant, if the feed is less than the maximum capacity, the space between the flights 40 will fill proportionately to the resistance of the die orifice 22. The space between the flights 40 remain incompletely filled until a back pressure is encountered. Back pressure generated by the friction of the die is generally sufficient. However, because die friction is substantially reduced in the present invention, it is sometimes desirable to provide additional back pressure. This can be done by increasing the length of land 54 (FIG. 2), or by decreasing the area of the die orifice 22, formed by the die pin 24 and die bushing 26. Providing annular grooves 60 in the inner surface of the die bushing 26 contributes to smooth out the extrudate by subjecting it to longitudinal shear.

When the space between flights is continuously filled, a constant condition results. With back pressure sufficient to fill the space between the flights, a back flow is generated which further enhances the pressure uniformity and also provides greater temperature uniformity. A better and more uniform polymer extrudate is produced when the pressure and temperature are uniform in the system. Again, this is especially important in the production of thin film.

The length and depth of the flights of the die screw 18 can also have an effect on the performance of the screw-die extruder 12. A more uniform pressure is provided with longer flights having a greater depth in that the continuous line of polymer between the flights is longer and larger, and this also enhances the uniformity of the product. Additionally, by having a greater depth of the flights, the rate of flow of the extruded material per revolution, increases with the depth of the flights.

However, screw specifications such as the number of flights, the dimensions of the lead and depth of the flight, are also determined to some extent by the polymer to be extruded. The practice of employing a lead equal to the outside diameter of the screw 18 has been found to be satisfactory. The depth of the flights normally is more shallow at the discharge end of the screw 18 to increase the pressure. When a single flight screw is used, surging can occur and a non-uniform product can result. Accordingly, a multiple flight screw is preferred. Theoretically, the greater the number of flights, the greater is the uniformity of product which will be achieved. However, practical considerations limit the number. A four flight screw has been found to be most effective and practical In operation the pin 24 rotates within the die bushing 26. This rotational motion tends to cause the extrudate to also rotate. It has been found that this twisting effect can be substantially reduced or entirely eliminated by insuring that the extrudate terminates contact with the rotating pin while in a molten condition and prior to the point that it terminates contact with the stationary die bushing 26. This can be accomplished in many ways.

The pin can be recessed relative to die bushing or the pin end can be modified in various ways by removing contact surface from the end of the pin. Various examples of such modifications have been illustrated in FIGS. 6 through 9, inclusive as optional embodiment of this invention. The configuration of the die pin, however, is of relatively little importance relative to the distance (D) between the terminal contact of the molten extrudate with the rotating pin and the terminal contact with the stationary die bushing.

This distance can effectively vary with the employment of various thermoplastic extrusion compositions and formulations, as well as the characteristics of the equipment employed, and also in respect to the specifications of the extrudate desired. However, for general polyvinyl chloride film production, distances between the aforesaid terminal contacts of from 0.030 to 0.25 inch and preferably from 0.060 to 0.125 inch, have been found to be effective in substantially reducing the tendency of the extrudate to twist.

Figure 10:
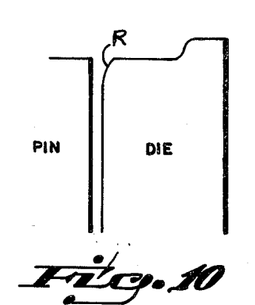

It is necessary to terminate contact with the rotating pin 24 prior to the point that it terminates contact with the stationary die bushing 26. Indicated in FIG. 10 is another alternative in which the edge of the die bushing 26 is rounded with a radius R. With a proper adjustment of the relative temperature so that the pin 24 is hotter than die bushing 26, the extrudate is forced toward the outside, i.e., toward the die bushing 26 as it is being extruded, in such a way that it first terminates contact with pin 24 before terminating contact with die bushing 26.

The hotter surface of pin 24 causes the more fluid material to flow faster than the cooler material in contact with cooler die bushing 26, resulting in forces that tend to curl the material outward.

The temperature range to which the thermoplastic polymer is heated in the feed extruder 10 and which it is substantitally maintained in the screw-die extruder 12 is that which is sufficient to flux the polymer and necessary for the extrusion of the polymer. The specific temperature will of course vary with the particular thermoplastic employed. However, in the case of polyvinyl chloride it has been found that a temperature of from about 360° Fahrenheit to about 420° Fahrenheit is effective and does not degrade the extrudate.

The apparatus and process of this invention is suitable for use with any thermoplastic polymer.

Illustrative of the thermoplastic polymers which can be employed in the conduct of the present art are those produced from a monomeric material containing the group either through homopolymerization or copolymerization with one or more other copolymerizable monomers.

Examples of such monomeric materials are those containing from about 2 to about 16 carbon atoms and can be illustrated by the following: lower α-olefin monomers such as ethylene, propylene, butene, and the like; the aromatic vinyl monomers such as styrene, chlorostyrene, α-methyl styrene and the like; vinyl and vinylidene halides such as vinyl chloride, vinyl fluoride, vinylidene chloride and the like; vinyl esters such as vinyl formate, vinyl acetate, vinyl propionate, vinyl butyrate, vinyl chloroacetate, vinyl chloropropionate and the like; acrylic and α-alkyl acrylic acids, their amides and nitriles such as acrylic acid, chloro acrylic acid, methacrylic acid, ethacrylic acid, methyl acrylate, ethyl acrylate, butyl acrylate, n-octyl acrylate, 2-ethyl hexyl acrylate, n-decyl acrylate, methyl methacrylate, butyl methacrylate, methyl ethacrylate, ethyl ethacrylate, acrylamide, N-methyl acrylamide, N,N-dimethylacrylamide, methacrylamide, N-methyl methacrylamide, N,N-dimethyl methacrylamide, acrylonitrile, chloroacrylonitrile, methacrylonitrile, ethacrylonitrile and the like; maleic and fumaric acids and their esters such as dimethyl maleate, diethyl maleate, mono-butyl maleate and the like; vinyl alkyl ethers and ketones such as vinyl methyl ethers, vinyl ethyl ethers, vinyl isobutyl ether, vinyl isobutyl ether, 2-chloroethyl vinyl ether, vinyl isobutyl ether, 2-chloroethyl vinyl ether, methyl vinyl ketone, ethyl vinyl ketone and the like.

Included within this definition of thermoplastic polymers are those polymers prepared with a small amount of cross-linking agent such as divinyl benzene, cyclopentadiene and the like; and also the isomonomeric resins.

While any of the above described homopolymers or copolymers can be effectively employed in the process of this invention the following resins have been found especially useful: polyvinyl chloride, vinyl chloride-vinyl acetate copolymer, poly(ethelene terephthalate), polyethylene, polypropylene, polyvinylidene chloride, ethylene-propylene copolymer and ethylenepropylene-diene terpolymer. Rigid polyvinyl chloride resin formulations are particularly preferred.

When the apparatus of this invention is to be employed in operations requiring the extrusion of a large volume of thermoplastic, such as in the manufacture of large diameter or thick walled pipe, plate or the high speed production of thin film, it may be desirable or necessary to employ multiple feed extruders to supply molten resin to the screw die from several parts in order to maintain a proper balance. The number and size of the feed extruders which can be employed is limited only by the diameter of screw die, the attendant space requirements, the capacity of the screw-die extruder and the rate at which extrusion is to be effected. Up to four extruders can generally be easily mounted on the screw-die although eight and more can be mounted on very large diameter models.

As indicated earlier the apparatus and process of this invention can be used to produce large diameter pipe and plate. When so employed, several other considerations must be taken into account. For example, when the apparatus of this invention is employed in the production of thin film it is possible to employ a die bushing considerably larger than the diameter of the screw in the screw-die extruder. In the manufacture of large diameter and/or thick walled pipe, a die bushing of smaller size than the diameter of the screw in the screw die extruder may be used. The same is true in the manufacture of heavy plate and in the extrusion of parisons.

Additionally as indicated above, in the manufacture of thin film, it is generally preferable to mount the screw-die in such a manner that vertical extrusion results. This is not generally true in the extrusion of pipe as a conventional sizing die-box is generally used to size and cool the extrudate and this is generally more conveniently operated when the screw-die is mounted to extrude horizontally. Again, the same is true for the production of heavy plate.

When heavy plate is prepared employing the apparatus and process of this invention a pipe of the desired diameter and wall thickness is extruded. While still in a molten condition the pipe is slit longitudinally and permitted or forced to lay flat and open on a suitable flat surface or over rolls. The thus formed plate is cut to the desired length and then annealed to remove stress. This method is believed superior to the conventional practice of laminating sheet thermoplastic to the desired thickness. The annealing step can of course be conducted in a conventional annealing oven of suitable dimensions and temperatures specifications for the particular polymer employed.

Another application of the invention is in production of a parison for blow molding, especially in the production of rigid P.V.C., polyvinyl chloride items or of any other heat degradable polymers.

Most of the problems encountered in the blow molding of rigid PVC are eliminated by the apparatus of this invention.

Thermal degradation of the polymer is eliminated due to the short residence time in the die caused by the forced displacement that the screw imparts to the material. Spider lines are eliminated since there is no spider. Better transparency of the material due to the possibility of processing at higher temperature which can be done because of the low residence time in the die, since PVC becomes more transparent with higher processing temperature.

Some plastics, particularly PVC, deteriorate and discolor when subjected to heat for a prolonged period of time, i.e., deterioration is a function of both temperature and time. Various stabilizers, such as cadmium octoate, organo tin mercaptides, barium octoate, cadmium stearate, thiolauric anhydride, and the like have been used to prevent this deterioration. However, some of these stabilizers are not useable in making PVC for use in food grade packaging material due to their toxicity. In the method of my invention the plastic is only subjected to a high temperature for a very short period of time. Many stabilizers used in PVC which are non-toxic are normally not very effective in preventing deterioration of the plastic, but due to the short time they are subjected to high temperature in the method of my invention, these non-toxic stabilizers now become practical and useable.

Since it is obvious that various changes and modifications may be made in the above description, without departing from the nature and spirit thereof, this invention is not restricted thereto, except as set forth in the appended claims.

What is claimed is:

1. A screw-die extruder for producing annular extrudate characterized by uniformity of wall thickness, said screw-die extruder comprising a housing in which is provided at least one entry for the introduction entry of thermoplastic material from a feed extruder, a pressure generating screw rotatably mounted within said housing, said screw being connected to a rotary drive means, a die pin fixedly connected to the discharge end of said screw, a stationary die bushing mounted on said housing, encompassing said die pin to define an annular orifice in which said die pin rotates at the same rate as said screw, an axially located passageway extending through the length of said screw die extruder with two coaxial tubes of different diameters having a spaced relationship between them being mounted coaxially within said passageway such that three concentric passageways are formed, the outertube having a plurality of vents through its wall, the central of said passageways connecting to an axial passageway through said die pin and connected at its other end to an air source, the second passageway, defined by the spacing between said two coaxial tubes, being sealed at its forward end at the die pin and connected at its other end to a coolant source, the third of said passageways, defined between said outer coaxial tube and the wall of the axial passageway through the screw, being sealed at said die pin and connected at its other end to a conduit for removal of said coolant passing from the second passageway through said vents.

2. The screw-die of claim 1 wherein said coolant is water and air, such as in a fog or spray form.

3. The screw die extruder of claim (1) 1 wherein the rotatably mounted die pin and stationary die bushing are so configured that the extrudate contact surface of the die pin terminates a (predetermined) sufficient distance prior to the terminal extrudate contact surface of the stationary die bushing to cause the extrudate to remain in contact with said bushing after passing beyond said pin and in that way eliminating the rotational movement of the extrudate.

4. The screw-die extruder of claim 1 wherein the rotatably mounted die pin and stationary die bushing are so configured that the extrudate contact surface of the die pin terminates from 0.030 to 0.25 inch prior to the terminal extrudate contact surface of the stationary die bushing.

5. The screw-die extruder of claim 3 wherein the extrudate contact surface of the pin terminates from 0.060 to 0.125 inch prior to termination contact with the stationary die bushing.

6. The screw-die extruder of claim 1 including annular groove means in the inner surface of said stationary die bushing.

* * * * *

UNITED STATES PATENT OFFICE
CERTIFICATE OF CORRECTION

PATENT NO. : 3,879,158
DATED : April 22, 1975
INVENTOR(S) : ENRIQUE SCHELE

It is certified that error appears in the above-identified patent and that said Letters Patent are hereby corrected as shown below:

Column 4, line 51 change "intergral" to --integral--.

Column 9, line 46 change "P.V.C." to --PVC--.

Column 10, line 46 change "claim (1) 1" to --claim 1--.

Column 10, line 49 delete "(predetermined)".

Signed and Sealed this twenty-second Day of June 1976

[SEAL]

Attest:

RUTH C. MASON
*Attesting Officer*

C. MARSHALL DANN
*Commissioner of Patents and Trademarks*